No. 866,205. PATENTED SEPT. 17, 1907.
C. LEE.
DEVICE FOR LAYING OUT AND SETTING UP MOLDING CUTTERS.
APPLICATION FILED JAN. 9, 1906.

2 SHEETS—SHEET 1.

Witnesses:
Ernest A. Telfer
Franklin E. Low

Inventor:
Charles Lee,
by his attorney,
Charles J. Gooding.

THE NORRIS PETERS CO., WASHINGTON, D. C.

No. 866,205. PATENTED SEPT. 17, 1907.
C. LEE.
DEVICE FOR LAYING OUT AND SETTING UP MOLDING CUTTERS.
APPLICATION FILED JAN. 9, 1906.

2 SHEETS—SHEET 2.

UNITED STATES PATENT OFFICE.

CHARLES LEE, OF CAMBRIDGE, MASSACHUSETTS.

DEVICE FOR LAYING OUT AND SETTING UP MOLDING-CUTTERS.

No. 866,205.     Specification of Letters Patent.     Patented Sept. 17, 1907.

Application filed January 9, 1906. Serial No. 295,266.

*To all whom it may concern:*

Be it known that CHARLES LEE, a citizen of the United States, residing at Cambridge, in the county of Middlesex and State of Massachusetts, have invented new and useful Improvements in Devices for Laying Out and Setting Up Molding-Cutters, of which the following is a specification.

This invention relates to a device for laying out the irregular cutting edges of cutters for molding machines, so that when the cutter is placed upon the rotary head of the molding machine and the machine operated the molding which is cut by the rotation of the cutters will be of the exact shape of the design required to be reproduced.

If the cutters were attached to the rotary head in such a manner that the front faces thereof were located in a plane radial from the axis of the rotary cutter head, the shape of the cutting edge of the cutter would evidently be a duplicate of the irregular curve which it is desired to reproduce in the molding made on the machine, but in a large part of the molding machines now in use the cutters are adjustably fastened to a cutter head with the front faces of said cutters lying in a plane not radial from the axis of the cutter head, but lying in a plane parallel to, and at a short distance from, said axis. This location and arrangement of the cutters makes it necessary to form the cutting edge of the cutter upon a different curve from that which it is desired to reproduce in the completed molding as hereinafter fully described, and it is for the purpose of enabling the workman to accurately lay off a curve which shall include an allowance for this difference between the shape required as to the cutter edge from that to be produced in the completed molding, that this device has been produced.

The difference or allowance which has to be made between the shape of the cutter edge and the curve which said cutter finally produces in the completed molding is due to what is technically known as the "over-hang" of the cutter.

The invention consists of a tool graduated as described in the following specification, and particularly as set forth in the claims thereof.

Figure 1:
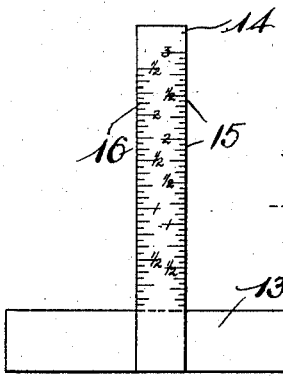
Figure 3:
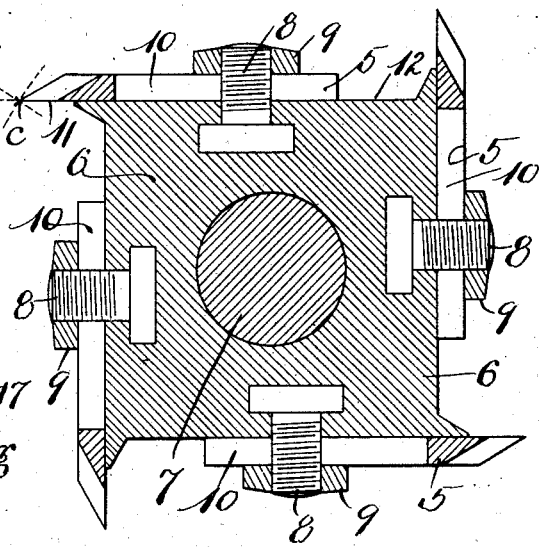
Figure 2:
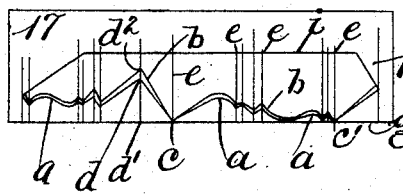
Figure 4:
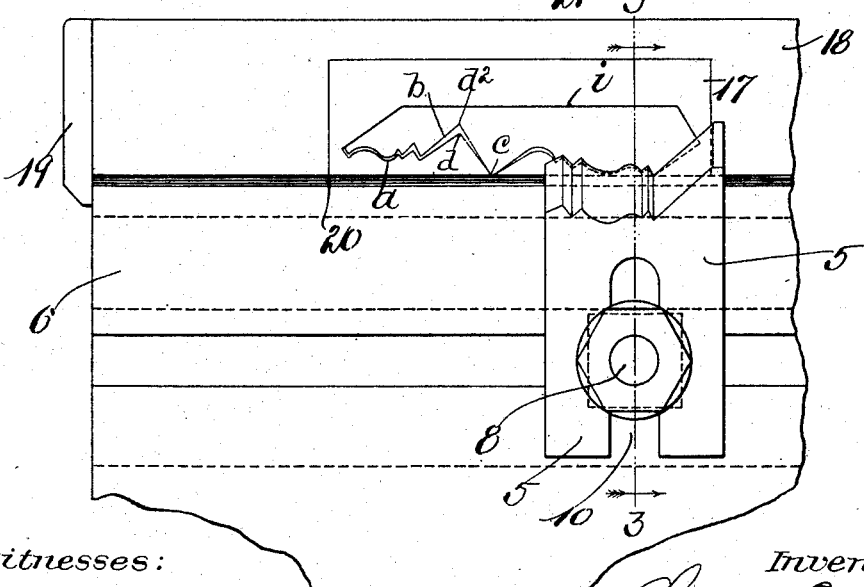
Figure 5:
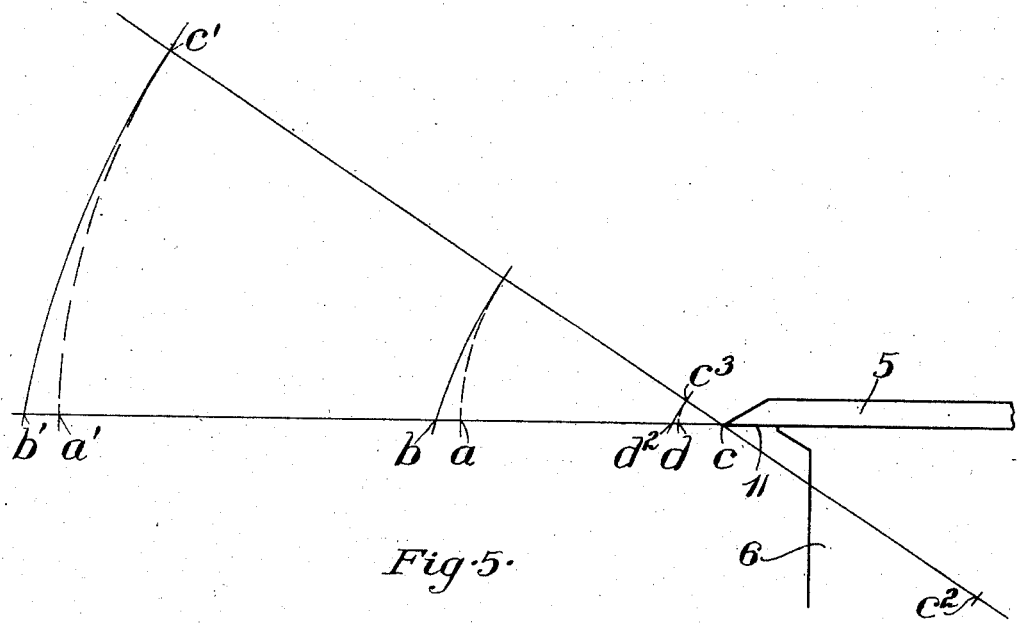

Referring to the drawings: Figure 1 is a plan view of a T-square, the blade of which is provided with two scales one of which is graduated in accordance with my invention. Fig. 2 is a diagram illustrating the manner of laying out the curve by which the cutting edge of the cutter is to be formed in accordance with my invention. Fig. 3 is a transverse section, partly in elevation, of a cutter head with the cutters attached thereto, and Fig. 4 is a front elevation of a cutter head with one cutter attached thereto, and a diagram holder with a diagram attached thereto shown in connection with said cutter head in position to test the accuracy of the shape of the cutting edge of said cutter, said diagram holder and cutter head being broken away to save space in the drawings. Fig. 5 is a diagrammatic view.

Like numerals refer to like parts throughout the several views of the drawings.

Referring to Figs. 2 and 3, the irregular curve $a$ is the curve of the molding which is to be produced, that is, the shape in cross section of the curved face of said molding, while the curve $b$ is the curve upon which the cutting edge of the cutter must be formed in order to produce the curve $a$ in the finished molding. The reason for this difference of the "over-hang" of the cutter between the curves $a$ and $b$ will be apparent by reference to Fig. 3, in which 5, 5 are the cutters, 6 the cutter head, and 7 the shaft to which said cutter head is fastened and by which, it, together with the cutters thereon is rotated. 8, 8 are clamp bolts and 9, 9 clamp nuts, by means of which the cutters 5 are firmly clamped to the cutter head 6, the bolt 8 in each case extending through a slot 10 in its respective cutter.

It will be noted that the front face 11 of each of the cutters 5 lies against the face 12 of the cutter block 6, and each of the faces 12 lie in a plane which is not radial from the axis of the cutter head, but is parallel to said axis and located at a distance therefrom. Now referring to the cutter 5 in the upper portion of Fig. 3, and assuming that the point $c$ of said cutter corresponds with the point $c$ on the diagram, Fig. 2, then if it is desired to form the cutting edge of the cutter 5 so that in practical operation it will cut a molding of the shape indicated by the irregular curve $a$, then the edge of the cutter must be formed upon the irregular curve indicated by the letter $b$. For instance, taking the point $d$, we find that instead of laying off along the front face 11 of the cutter 5, the distance $d$, $d'$ Fig. 2, it will be necessary to lay off the distance $d'$, $d^2$ along the front face 11 of the cutter 5 in order to obtain an increase in distance from the axis of the cutter head 6, or in other words a radial increase equal to the distance $d'$; $d$, and it is the radial increase which is effective in producing an increase in the depth of cut.

By reference to Fig. 3 this will be clearly seen referring to the dotted lines on the left of the upper cutter 5, in which the distance $c$, $d$ equals the distance $d'$, $d$, Fig. 2, which distance is the extra depth of cut desired in the formation of the molding whose contour is illustrated by the irregular curve $a$, but it will be clearly seen that this distance $c$, $d$ or $d'$, $d$ laid off along the front face of the cutter 5 is too short to obtain the desired result in radial distance or effective distance by the amount $d$, $d^2$, and this amount is the "over-hang".

In Fig. 1 is illustrated a tool which embodies my invention, the same consisting of a T-square having a head 13 and a blade 14; the blade 14 has two graduated scales thereon, namely, the scale 15 and the scale 16. The scale 15 may be any standard scale, while the scale 16 is the "over-hang" scale. The graduations of the scale 16 differ from those of the scale 15 by an amount sufficient to compensate for the loss in distance from the axis of said cutter head of measurements laid off in the plane of the front face 11 of the cutter 5 transversely of the cutter head 6 as compared with the same measurement laid off radially from said axis. To illustrate, take the distance marked "1/2" on the standard scale 15; to find the correct amount to lay off on the face 11 of the cutter to obtain a corresponding radial cut in the completed molding, the distance marked "1/2" on the "over-hang" scale should be laid off on the face 11 transversely of the cutter head.

The practical operation of my improved device for laying out and setting up molding cutters is as follows: The workman has given him an irregular curve such as $a$ Fig. 2, and it is desired that he shall reproduce this curve in the form of molding. To do this he takes a piece of paper 17 lays the curve $a$ off on it as shown in Fig. 2 and then with the T-square draws the lines $e$, $e$, $e$, Fig. 2, at right angles to the base line $g$, which base line is drawn parallel to the back face $i$ of the molding and through the points $c$, $c'$ which are farthest removed from the back face $i$. He then moves the T-square along until the standard scale gives him the distance from the line $g$ to any given point, such as, for instance, the point $d$ and then moves the T-square along until the "over-hang" scale is in line with the point $d$ when he marks on the paper the point $d^2$, which corresponds in the "over-hang" scale to the point $d$ which he has just measured on the standard scale. In this way he gets a series of points from his "over-hang" scale for the irregular or "over-hang" curve $b$ and then draws the curve through these points as illustrated in Fig. 2. Having now obtained the "over-hang" or irregular curve upon which the cutting edge of the cutters must be formed in order to produce in the molding the true curve $a$, he attaches the paper templet 17 to a templet holder 21 consisting of a flat strip 18 preferably of pine wood, a head 19 fast thereto, and a strip of dark material such as black walnut or ebony fast to the strip 18 and extending longitudinally thereof.

In attaching the templet 17 to the templet holder 21, the highest points of the molding $c$, $c'$ are placed in alinement with the upper edge of the dark strip 20, Fig. 4, care being taken that the back face indicated by line $i$ shall be kept parallel with the strip 20. The templet holder is then held by the workman with the strip 20 in contact with one edge of the cutter head and extending longitudinally thereof and the cutter which is to be shaped is fastened to the cutter head as shown in Fig. 4, said cutter is then ground by the workman until the different points in the cutting edge thereof coincide with the curve or irregular line $b$, and is then fastened to the cutter head; the molding is cut by the molding machine by the rotation of the cutter head 6 and the knives 5 fast thereto in a manner well known to those skilled in this art.

It is evident that the scale 15 may be of any desired standard so long as the "over-hang" scale 16 is laid off to correspond with said standard and so that its graduations shall differ from the graduations of the standard scale by an amount sufficient to equal said standard graduations plus the "over-hang" of the cutter which is to be formed by the method hereinbefore set forth.

The term "overhang" hereinbefore referred to may be understood by reference to the diagrammatic illustration Fig. 5, in which 11 is the face of the cutter 5 which rests upon the cutter block, said face not being radial to said block. The line 11 is extended along the line $c\,b'$, while $c^2\,c'$ is the radial line of the cutter head. Assuming the point $c$ to be the highest point in the curve which is to be cut from the molding and that it is desired to cut at any point in the molding a depth equal to $c\,d$, if the face 11 of the cutter were coincident with the radial line $c\,c'$, then the distance $c\,d$ would be added to the cutter edge at the points where it is desired to cut the extra depth $c\,d$, but as said face 11 is not on the radial line $c\,c'$, a distance $c\,d^2$ must be added to the edge of the cutter in order to obtain in the molding a depth of cut equal to $c\,d$. The point $d^2$ is obtained by laying off the distance $c\,c^3$, which is equal to $c\,d$, on the radial line $c'\,c^2$, then describing the arc $c^3\,d^2$ from the center $c^2$ of the cutter head. The distance $d\,d^2$ is the overhang corresponding to the distance $c\,d$, which is the real distance desired to be cut into the molding beyond the point $c$, which is the highest point in the molding. The same is true if it is desired to cut a depth $c\,a$. In this case the overhang would be $a\,b$. If it is desired to cut a depth $c\,a'$ beyond the point $c$, then the overhang would be $a'\,b'$ and by reference to Fig. 2 the overhang of the cutter, as a whole, which is to cut a curve or arc shape corresponding to the line $a$ would be the space between said line $a$ and the line $b$.

Having thus described my invention, what I claim and desire by Letters Patent to secure is:

1. A tool having two graduated scales thereon for laying out the cutting edge of a cutter adapted to be fastened to the rotary cutter head of a molding machine, with the front face of said cutter in a plane parallel to and located at a distance from the axis of said cutter head, the distance between any two graduation marks of one of said scales differing from the distance between any two corresponding graduation marks of the other of said scales relatively to the zero points of each of said scales, respectively, by an amount sufficient to compensate for the loss in distance from the axis of said cutter head, of a measurement laid off in a plane transversely of said cutter head and outwardly from a given point, as compared with the same measurement laid off from said point radially from said axis.

2. A tool for laying out the cutting edge of a cutter for molding machines, said tool having two graduation scales thereon, the distance between any two graduation marks of one of said scales differing from the distance between any two corresponding graduation marks on the other of said scales relatively to the zero points of each of said scales, respectively, by an amount equal to the corresponding overhang of the cutting edge of said cutter.

3. A tool for laying out the cutting edge of a cutter for molding machines, said tool having two graduated scales thereon, the distance between any two graduation marks of one of said scales differing from the distance between any two corresponding graduation marks of the other of said scales relatively to the zero point of said scales, respectively, by an amount sufficient to compensate for the loss in distance from the axis of a rotary cutter head, to which said cutter is fastened, with the front face of said cutter in a plane parallel to and located at a distance from the axis of said cutter head, of a measurement laid off in a plane transversely of said cutter head and outwardly from a given point as compared with the same measurement laid off from said point radially from said axis.

4. A T-square for laying out the cutting edge of a cutter, having a blade with two graduated scales thereon, the distance between any two graduations of one of said scales differing from the distance between any two corresponding graduations of the other of said scales relatively to the zero point of said scales, respectively, by an amount equal to the corresponding overhang of the cutting edge of said cutter.

In testimony whereof I have hereunto set my hand in presence of two subscribing witnesses.

CHARLES LEE.

Witnesses:
CHARLES S. GOODING,
ANNIE J. DAILEY.